United States Patent [19]

Hockett

[11] E Re. 30,289

[45] Reissued Jun. 3, 1980

[54] SAND BLASTING APPARATUS

[76] Inventor: Wayne B. Hockett, 1701 E. Sligh Ave., Tampa, Fla. 33605

[21] Appl. No.: 905,116

[22] Filed: May 11, 1978

Related U.S. Patent Documents

Reissue of:

[64] Patent No.: 4,027,433
Issued: Jun. 7, 1977
Appl. No.: 614,191
Filed: Sep. 17, 1975

[51] Int. Cl.[2] ..... B24C 3/06; B24C 3/32

[52] U.S. Cl. ..... 51/429; 51/410; 239/587

[58] Field of Search ..... 51/410, 427, 429; 114/222; 239/176, 280.5, 281, 450, 536, 587

[56] References Cited

U.S. PATENT DOCUMENTS

| | | | |
|---|---|---|---|
| 1,230,458 | 6/1917 | Bovery | 239/587 X |
| 2,495,375 | 1/1950 | Lishman | 239/280.5 |
| 2,729,918 | 1/1956 | Van Denburgh | 51/429 |
| 2,763,964 | 9/1956 | Luce | 51/410 |
| 2,836,013 | 5/1958 | Koenig | 51/427 |
| 3,048,387 | 8/1962 | Waggoner | 269/69 X |
| 3,074,649 | 1/1963 | Atkinson | 239/587 X |
| 3,149,438 | 9/1964 | Morley | 51/427 |
| 3,225,777 | 12/1965 | Shelton | 239/587 X |
| 3,604,627 | 9/1971 | Miscourch | 239/587 X |
| 3,705,565 | 12/1972 | Hammelmann | 51/410 X |

*Primary Examiner*—Gary L. Smith
*Attorney, Agent, or Firm*—Stein & Frijouf

[57] ABSTRACT

An abrasive cleaning apparatus configured for use in combination with a mobile chassis comprising a base means including attachment means to fasten the abrasive cleaning apparatus to the mobile chassis, an adjustable nozzle support means to operatively support a plurality of nozzle means thereon and interconnecting boom means coupled between the base means and adjustable nozzle support means. The interconnecting boom means includes a first and second boom element arranged in telescoping relation relative to each other to permit linear adjustment of the adjustable nozzle support means relative to the base means and mobile chassis. The adjustable nozzle support means includes a first and second positioning means to permit movement of the plurality of nozzle means in a first and second plane respectively.

5 Claims, 3 Drawing Figures

10
12
14
16
18
20
22
24
26
28
30
32
34
38
39
40
42
44
46
48
50
52
56
58
60
62
64
66
68
a
b
c
d

SAND BLASTING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

An abrasive cleaning apparatus including an adjustable nozzle support means having a first and second positioning means to permit movement of a plurality of nozzle means in a first and second plane respectively.

2. Description of the Prior Art

Sand blasting of surfaces cleaned preparatory to painting and simply cleaning in the case of stone or brick walls is a common practice. Generally, this is accomplished by an operator positioned on a scaffold or other suitable support manually manipulates at least one discharge nozzle. Obviously, the presence of the operator in the work zone makes this an extremely dirty and hazardous occupation. Moreover, the limited volume of sand blasted against the surface by a single nozzle is very inefficient.

As a result, abrasive blast apparatus, particularly used for large surface areas, may employ multiple rather than a single blast nozzle. The obvious advantage of this being a greatly increased blast pattern. Due to the increased weight and speed of operation, these nozzles are often mounted on movable carriages or platforms on which the operator rides. The platform is movable laterally and vertically along the area to be cleaned which results in significant labor saving devices.

Unfortunately, a number of difficulties have been experienced which hindered general acceptance and wide use for the multi-nozzle head. For example, many multi-nozzle heads are of a type in which the sand and air are delivered and mixed in a common reservoir from which jet streams are propelled simultaneously from the nozzles all of which communicate directly with the reservoir. In another configuration, the operator may be provided with two separate nozzles each having its own supply lines. In either of these arrangements, individual control of the nozzles is lacking to the extent that the blast stream from one nozzle cannot be cut off independently of the other. Such independent manipulations of the blast from the different nozzles is desirable in situations involving spots or areas which present difficult cleaning problems. The blast from one nozzle must work on this different area for a prolonged period, during which time and other blasts will be cutting away injuriously at the clean metal or surrounding areas.

Another difficulty with previous multi-blast carriage arrangements is that the units are very cumbersome and complex so as to be suitable only for special cleaning operations. Also many such [mulitiple] *multiple* nozzle machines have lacked adequate flexibility of movement and could not be easily manipulated.

Thus, there is a clear need for an efficient, flexible and easily moved multiple nozzle blasting apparatus.

SUMMARY OF THE INVENTION

This invention relates to an abrasive cleaning apparatus configured for use with a mobile platform or chassis such as a fork lift or the like. More specifically, the abrasive cleaning apparatus comprises a base means for mounting the abrasive cleaning apparatus on the mobile chassis, an adjustable nozzle support means to operatively support a plurality of nozzle means thereon and interconnecting boom means coupled between the base means and the adjustable nozzle support means.

The base means comprises a base plate including an attachment means to detachably attach the abrasive cleaning apparatus to the mobile chassis. As more fully described hereinafter, the base plate and interconnecting boom means cooperatively from a first adjustment means to adjust the rotational position of the adjustable nozzle support means relative to the base plate.

The adjustable nozzle support means includes a first and second positioning means to permit movement of the plurality of nozzle means in a first and second plane respectively. The first positioning means comprises a substantially rectangular frame pivotally attached to the outer portion of the interconnecting boom means. The second positioning means comprises a mounting frame pivotally attached to the outer end of the first positioning means to support the plurality of nozzle means.

The interconnecting boom means comprises a first and second boom element arranged in telescoping relation relative to each other to adjust the linear position of the adjustable nozzle support means relative to the base plate.

In operation, the operator stands on the platform adjacent the adjustable nozzle support means. As can be readily understood the plurality of nozzle means is coupled to a remote supply source through a conduit means. For example, the remote supply source may comprise a sand hopper which also incorporates an appropriate compressed air supply to forcefully transport and drive the abrasive from the nozzles. In a manner which will be understood, a supply of compressed air is directed along with the sand into flexible sand conduits for transporting the sand through these conduits. In addition, compressed air may also be directed into flexible air conduits. This separate supply of air under pressure eventually being directed into a mixing reservoir within the blast nozzles to and against the work. The manner in which the air and sand is mixed in the nozzle is of no particular concern. The nozzle structure of the present mechanism itself can be on any appropriate conventional configuration.

To adjust the abrasive cleaning apparatus, the interconnecting boom means is rotated relative to the base plate to the desired position. The second boom element is then adjusted in telescoping relation relative to the first boom element to the desired position. Once the abrasive cleaning apparatus has been adjusted relative to the work surface, the operator is ready to clean the work surface with the blasting device supplying the blasting medium under pressure.

The operator then cleans the work surface, manipulating the adjustable nozzle support means by pivoting the first and second positioning means in the first and second planes relative to the work surface and base plate. In this manner, the operator is able to clean an enlarged work surface through the use of multiple nozzles without the necessity of supporting the nozzles or air and abrasive supply conduits. The mobile chassis is then moved to an adjacent work surface until the entire area is cleaned.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figures 1, 2, 3:
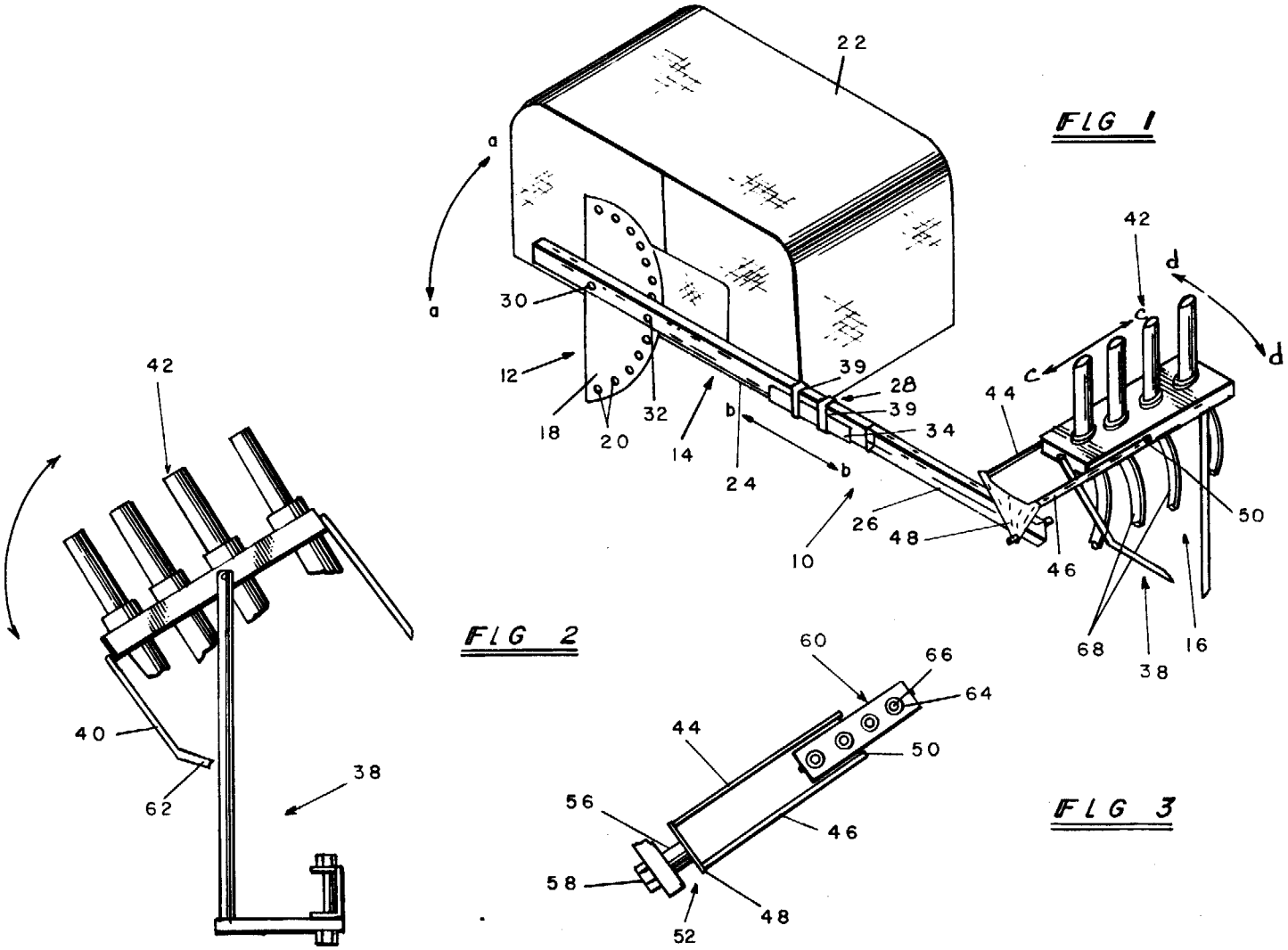
FIG. 1 is a perspective view of the abrasive cleaning apparatus.
FIG. 2 is a side view of the abrasive cleaning apparatus.
FIG. 3 is a top view of the abrasive cleaning apparatus.

As best shown in FIG. 1, the present invention comprises an abrasive cleaning apparatus generally indicated as 10 for cleaning large work surfaces. The abrasive cleaning apparatus 10 comprises a base means 12, interconnecting boom means 14 and adjustable nozzle support means 16.

As shown in FIG. 1, the base means 12 comprises a substantially flat hemispherically shaped base plate 18 having a plurality of apertures 20 formed about the periphery thereof. The base plate 18 is detachably attached to an operator cage 22 mounted on a mobile platform or other suitable support means (not shown) by suitable attachment means (not shown). As more fully described hereinafter, the base means 12 and interconnecting boom means 14 cooperatively form a first adjustment means to permit rotational adjustment of the adjustable nozzle support means 16 relative to the operator cage 22 and base means 12 as shown by arrow a—a.

As shown in FIG. 1, the interconnecting boom means 14 comprises first boom element 24, second boom element 26 and coupling means 28. The first boom element 24 is pivotably attached to base plate 18 by first fastening means 30 and further includes an engaging means such as a bolt/nut combination 32. Engaging means 32 cooperates with apertures 20 to permit adjustment of the adjustable nozzle support means 16 as previously described. The second boom element 26 is disposed in telescoping relationship to the first boom element 24. The coupling means 28 comprises a slide element 34, bracket elements 36 and fastening means 39. The fastening means is loosened such that the second boom element 26 may be telescoping*ly* moved linearally relative to the first interconnecting boom element 24 in the direction as shown by arrow b—b. This telescoping arrangement comprises a second adjustment means permitting adjustment of the adjustable nozzle support means 16 relative to the operating cage 22 and the base plate 18 as shown by arrow b—b.

The adjustable nozzle support means 16 comprises a first and second positioning means 38 and 40 respectively to permit movement of the plurality of nozzle means generally indicated as 42 in a first and second plane respectively as shown by arrows c—c and d—d respectively. The first positioning means 38 comprises a first and second member 44 and 46 respectively [held fixed spaced relationship by end members 49 and] *with mounting frame 60 pivoted at* 50. The first positioning means 38 further includes *boom* attachment [means 52 comprising] *plate 48,* tubular element 56 and securing means 58. [The entire adjustable nozzle support means 16 is pivotably mounted on second interconnecting element 38 by tubular element 56 extending through element 28 and secured thereto by securing means 58 which may comprise a cotter key or nut.] The second positioning means 40 comprises [a] *the* mounting frame 60 and handle 62 as best shown in FIGS. 1 and 2. The mounting frame 60 is pivotally mounted [on the outer end member] *at* 50 to [support the plurality of nozzle means 42] members *44 and 46.* The mounting frame 60 includes a plurality of apertures 64 formed therein to receive a corresponding plurality of nozzles 66.

In operation, the operator stands on the platform 22 adjacent the adjustable nozzle support means 16. As can be readily understood the plurality of nozzles [means] 42 is coupled to a remote supply source through a conduit means 68. For example, the remote supply source may comprise a sand hopper which also incorporates an appropriate compressed air supply for forcefully transport*ing* and driv[e]*ing* the abrasive from the nozzles. In a manner which will be understood, a supply of compressed air is directed along with the sand into flexible sand conduits for transporting the sand through these conduits 68. In addition, compressed air may also be directed into flexible air conduits. This separate supply of air under pressure eventually [being] *is* directed into a mixing reservoir within the blast nozzles 66 to and against the work. The manner in which the air and sand is mixed in the nozzle is of no particular concern. The nozzle structure 66 of the present mechanism itself can be on any appropriate conventional configuration.

To adjust the abrasive cleaning apparatus 10, the interconnecting boom means 14 is rotated relative to the base plate 18 to the desired position. The second boom element 26 is then adjusted in telescoping relation relative to the first boom element 24 to the desired position. Once the abrasive cleaning apparatus 10 has been adjusted relative to the work surface, the operator is ready to clean the work surface with the blasting device supplying the blasting medium under pressure.

The operator then cleans the work surface, manipulating the adjustable nozzle support means 16 by pivoting the first and second positioning means 38 and 40 respectively in the first and second planes relative to the work surface and base plate. In this manner, the operator is able to clean an enlarged work surface through the use of multiple nozzles without the necessity of supporting the nozzles or air and abrasive supply conduits. The mobile chassis is then moved to an adjacent work surface until the entire area is cleaned.

In this manner, an efficient, reliable and blasting apparatus is provided.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, I claim:

[1. An abrasive cleaning apparatus configured for use in combination with fluid medium pressure source, said abrasive cleaning apparatus comprising a base means for mounting said abrasive cleaning apparatus on a platform, an adjustable nozzle support means interconnected to said base means by interconnecting boom means, said adjustable nozzle support means including a first positioning means to pivotally adjust said adjustable nozzle support means in a first plane relative to said base means and a second positioning means coupled to said first positioning means to pivotally adjust said adjustable nozzle support means in a second plane relative to said base means, said first positioning means comprising a first and second element held in fixed relationship relative to one another by a pair of end members disposed at opposite ends thereof, said first positioning means being pivotally attached to the outer portion of said interconnecting boom means, said second positioning means comprises a frame including a plurality of apertures formed therein to receive a corresponding plurality of nozzles to fix said nozzles in fixed spaced relationship relative to one another, said second positioning means being coupled at substantially the midpoint thereof to the outer end member of said first positioning means to permit pivotal movement relative to one another, said second positioning means further includes a handle means fixedly attached thereto such that the weight of said nozzles is supported by said interconnecting boom means to permit movement of said adjustable nozzle support means in said first and second planes.]

[2. The abrasive cleansing apparatus in claim 1 wherein said interconnecting boom means and said base means cooperatively form the first adjustment means to rotatably adjust said adjustable support means relative to said base means in the plane of said base means.]

[3. An abrasive cleaning apparatus of claim 2 wherein said base means comprises a base plate having a plurality of apertures formed therein and said interconnecting boom means comprises a first boom element including an engaging means, said engaging means disposed to selectively engage one of said plurality of said apertures to selectively position said first boom element relative to said base plate.]

[4. The abrasive cleaning apparatus of claim 1 wherein said interconnecting boom means comprises a first and second boom element, said first and second boom element arranged in telescopic relationship relative to one another to comprise a second adjustment means to permit linear adjustment of said adjustable nozzle support means relative to said base means.]

[5. The abrasive cleaning apparatus of claim 4 wherein said interconnecting boom means further includes a coupling means to selectively fix the position of said second boom element relative to said first boom element.]

[6. The abrasive cleaning apparatus of claim 1 wherein said first plane is substantially perpendicular to the plane of said base means and said second plane is perpendicular to both said first plane and the plane of said base means.]

*7. An abrasive cleaning apparatus configured for use in combination with a fluid medium pressure source, comprising in combination:*

*a base means;*

*a mobile chassis receiving said base means for mobile operation;*

*a plurality of nozzles;*

*a plurality of conduits connecting said plurality of nozzles to the fluid medium pressure source;*

*means for securing said plurality of nozzles in fixed relationship relative to one another;*

*said means for securing said plurality of nozzles including a nozzle support securing said plurality of nozzles in a fixed substantially parallel relation;*

*an interconnecting boom means comprising a first and a second boom element for interconnecting said base means and said plurality of nozzles;*

*first adjustment means for pivotably adjusting said first boom element relative to said base means;*

*second adjustment means comprising said first and second boom elements arranged in telescopic relationship relative to one another to permit linear adjustment of said plurality of nozzles relative to said base means;*

*first and second positioning means for pivotably adjusting said plurality of nozzles relative to a terminal end of said second boom element;*

*said first and second positioning means each including only a single pivot for pivotably mounting said plurality of nozzles to said second boom element of said interconnecting boom means; and*

*said first and second positioning means respectively pivotably mounting said plurality of nozzles in first and second mutually perpendicular planes for enabling said plurality of nozzles to pivot said plurality of nozzles in two mutually perpendicular directions at said terminal end of said interconnecting boom means.*

*8. An apparatus as set forth in claim 7, wherein one of said first and second planes is substantially parallel to the plane of movement of said interconnecting boom means about said first adjustment means.*

*9. An apparatus as set forth in claim 7, wherein said base means comprises a base plate having a plurality of apertures formed therein and said interconnecting boom means comprises a first boom element including an engaging means, said engaging means disposed to selectively engage one of said plurality of said apertures to selectively position said first boom element relative to said base plate.*

*10. An apparatus as set forth in claim 7, wherein said interconnecting boom means further includes a coupling means to selectively fix the position of said second boom element relative to said first boom element.*

*11. An abrasive cleaning apparatus configured for use in combination with a fluid medium pressure source, comprising in combination:*

*a base means;*

*a mobile chassis receiving said base means for mobile operation;*

*a plurality of nozzles;*

*a plurality of conduits connecting said plurality of nozzles to the fluid medium pressure source;*

*a nozzle support means for securing said plurality of nozzles in fixed, substantially parallel relationship relative to one another;*

*an interconnecting boom means comprising a first and a second boom element for interconnecting said base means and said plurality of nozzles;*

*first adjustment means for pivotably adjusting said first boom element relative to said base means;*

*second adjustment means comprising said first and second boom elements arranged in telescopic relationship relative to one another to permit linear adjustment of said plurality of nozzles relative to said base means;*

*first and second positioning means for pivotably adjusting said nozzle support means containing said plural-*

*ity of nozzles relative to a terminal end of said second boom element;*

*each of said first and second positioning means consisting of only a single pivot for mounting said plurality of nozzles fixed in said nozzle support means; and*

*said first and second positioning means respectively pivotably mounting said nozzle support means about first and second mutually perpendicular axes for enabling said plurality of nozzles to pivot said plurality of nozzles in two mutually pependicular directions at said terminal end of said interconnecting boom means.*

* * * * *